United States Patent [19]

Wallsten

[11] 4,227,362

[45] Oct. 14, 1980

[54] METHOD OF FORMING A MULTIPLE PACK OF VESSELS

[76] Inventor: Hans I. Wallsten, Chemin de la Lisiere 6, Lausanne, Switzerland, CH-1018

[21] Appl. No.: 974,442

[22] Filed: Dec. 29, 1978

[30] Foreign Application Priority Data

Jan. 19, 1978 [SE] Sweden ................................ 7800642

[51] Int. Cl.³ ........................ B28B 11/08; B65B 35/50
[52] U.S. Cl. ..................................... 53/447; 206/497;
   220/406; 264/292; 264/296; 264/320
[58] Field of Search ................... 220/406; 113/120 H;
   206/497, 515; 425/398; 264/296, 292, 320;
   53/447

[56] References Cited

U.S. PATENT DOCUMENTS

| | | | |
|---|---|---|---|
| 2,218,388 | 10/1940 | Twombly | 206/515 X |
| 2,270,185 | 1/1942 | Dulmage | 113/120 H |
| 2,602,411 | 7/1952 | Schnell | 264/292 X |
| 3,214,797 | 11/1965 | Ollier et al. | 264/296 X |
| 3,218,379 | 11/1965 | Edwards | 264/292 X |
| 3,220,544 | 11/1965 | Lovell | 206/218 |
| 3,270,104 | 8/1966 | Dreyfus et al. | 264/554 |
| 3,362,604 | 1/1968 | LaGostina | 206/515 X |
| 3,434,589 | 3/1969 | Valtri et al. | 206/218 |
| 3,551,954 | 1/1971 | Knowles | 425/398 |
| 3,695,084 | 10/1972 | Siemonsen et al. | 113/120 G X |
| 3,751,552 | 8/1973 | Meadors | 264/320 |
| 4,024,951 | 5/1977 | Green | 206/497 X |
| 4,101,047 | 7/1978 | Geppert et al. | 428/35 X |

Primary Examiner—Allan N. Shoap
Attorney, Agent, or Firm—Brumbaugh, Graves, Donohue & Raymond

[57] ABSTRACT

A multipack for disposable bowl-shaped vessel inserts of the type having thin-walled side and bottom portions and a relatively stiff upper peripheral collar is made by vertically stacking a plurality of inserts together and folding the thin-walled bottom and side portions inside the upper collars by pushing the insert bottoms into the space enclosed by the collars. Single or multiple folds may be made and the stacked and folded inserts may be enclosed in a protective envelope. Apparatus and methods for making such multiple packs are also disclosed.

5 Claims, 7 Drawing Figures

METHOD OF FORMING A MULTIPLE PACK OF VESSELS

BACKGROUND OF THE INVENTION

The present invention relates to a multiple pack for substantially bowl-shaped, thin-walled, disposable vessels having a relatively stiff upper peripheral collar, and to methods and means for manufacturing such multiple packs.

The invention is of particular utility in the folding of thin-walled vessels of disposable type which, when stacked in the normal way, or individually, take up considerable space. For purposes of illustration, the invention will be described herein with reference to disposable inserts used as cooking vessels, although it is not in any way limited to such use.

Bowl-shaped, thin-walled, disposable inserts used with cooking vessels are known, and are described, for example, in U.S. Pat. No. 4,164,174. They are manufactured from a thin, flexible material capable of good heat transfer from a thermally conducting medium such as water vapor to the food contained therein. The insert is intended to be placed in a special support such as a mesh basket or the like, which, in turn, is placed inside a cooking vessel of conventional design. To facilitate its placement in the basket, such an insert is usually provided with a stiff upper edge or collar, the remainder of the wall and bottom portions being thin walled. The insert may be vacuum molded of a polythene material and formed so that the wall thickness of the upper portion or stiff upper collar is about 0.1 mm and the wall thickness of the sides and bottom is about 0.01–0.03 mm.

Since the inserts are disposable, and are therefore quickly used up, it is desirable for distribution purposes to market them in packs of convenient size, say 10–100 inserts stacked one inside the other in a suitable envelope or protective casing. However, since a typical insert may have a volume capacity of two liters, a diameter of roughly 200 mm and a height of about 180 mm, such inserts tend to be rather bulky from the standpoint of shipping, storage and handling, even when stacked. Also, since the sides and bottoms of such inserts are extremely flexible, it is sometimes difficult to stack them together.

SUMMARY OF THE INVENTION

It is an object of the invention, therefore, to provide a multiple pack of reasonable size for disposable vessel inserts of the kind described above which affords ease and simplicity of handling during distribution, storage and use.

Another object of the invention is to provide a multiple pack of the above character in which the inserts are enclosed in an envelope or protective casing.

A further object of the invention is to provide new and improved methods and means for manufacturing multiple packs of inserts of the above character.

These and other objects are attained according to the present invention by stacking a plurality of disposable vessel inserts into each other, with the thin-walled side and bottom portions telescoped into the upper stiff collars so as to form a multiple pack of substantially the same height as the stiffer collar sections of the stacked vessel inserts. The multiple pack may be encased in a conventional protective shrink film casing.

Multipacks may be produced according to the invention by stacking a plurality of inserts together in nested relation, holding the stiffer collar sections of the inserts while folding over the thin side walls and pushing the bottom walls back inside the nested vessels. In a preferred method of packaging the inserts, they are stacked upside down with the upper peripheral flanges of the insert collars supported on a similarly shaped flange on a form which also has an annular, upwardly extending, upwardly tapered tubular member, folding the side walls of the stacked inserts over the top edge of the tapered member and pushing the bottom walls of the stacked inserts down into the interior space formed by the stiffer collar sections of the stacked inserts.

The bottom walls of the inserts are either pressed down into the tubular member until they are substantially flush with the tops of the collar sections, or the side walls may be folded twice so that the second fold is near the bottom of the tubular member and the bottom walls are substantially flush with the top of the tubular member.

For a single fold, at least one movable cylindrical member is arranged to engage the bottom walls of the nested, upside down inserts and move them downwardly to a desired location inside the tubular member, the upper peripheral flanges of the insert collars being supported on the form during the folding operation. To this end, the cylindrical member is concentric with the tubular member and suitably sized to provide sufficient clearance to accommodate the folded side walls of the inserts.

Multiple folds in the flexible side walls of the stacked inserts may be made by repeated folding operations using several such cylindrical members movable towards the inserts from opposite sides thereof. The first fold may be made essentially as described for a single fold, a cylindrical sleeve-like member being used to push the bottoms of the stacked inserts through the stiffer upper collars to a location beyond the tops of the upside down inserts. The cylindrical sleeve member is then retracted somewhat and a second cylindrical member concentric with and suitably sized to enter the open end of the cylindrical sleeve member is inserted into the latter from the opposite direction to push the bottoms of the inserts back through the stiff upper collars so as to form a double fold.

SUMMARY OF THE DRAWINGS

For a better understanding of the present invention, reference may be had to the accompanying drawings and detailed description thereof in which.

DETAILED DESCRIPTION

Figure 1:
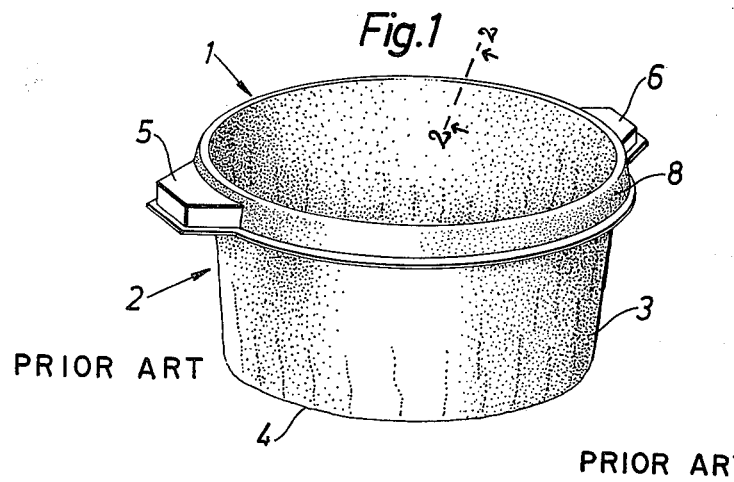
FIG. 1 is a perspective view of a prior art disposible insert of the kind disclosed in U.S. Pat. No. 4,164,174.
Figure 2:
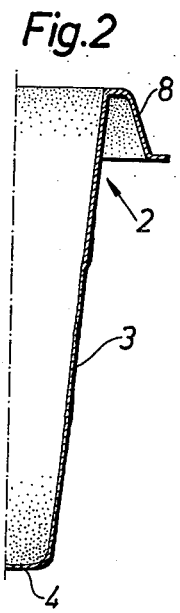
FIG. 2 is a partial vertical section, on an enlarged scale, taken along the line 2—2 of FIG. 1, looking in the direction of the arrows.

FIGS. 1 and 2 show a disposable insert 1 for cooking vessels of the type described in U.S. Pat. No. 4,164,174. It comprises a bottom wall 4 and a lower side wall portion 3 made of extremely thin, flexible material. The lower side wall portion 3 is joined to a relatively stiff upper side wall section 2, which terminates at its upper end in a downwardly and outwardly extending flange 8. Mounted on opposite sides of the flange are a pair of protruding grips 5 and 6 designed to cooperate with corresponding support surfaces on a support basket, not shown, which is, in turn, adapted to be suspended in any suitable manner in a conventional cooking vessel. For a 2-liter capacity, the insert 1 may have a diameter of 200 mm and a height of 180 mm, for example.

Figure 3:
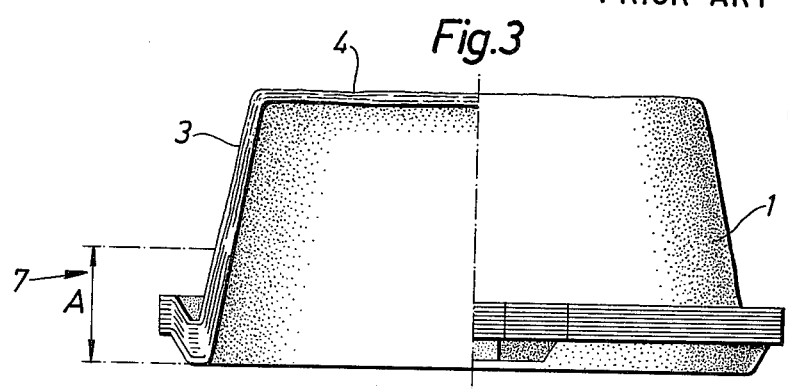
FIG. 3 is a front view, partially in section, of an inverted stack of disposable inserts.

In forming a multipack according to the invention, a plurality of disposable inserts are stacked together in nested relation in an inverted pile, as shown in FIG. 3. Such a stack has a stiff collar section 7 of height A.

Figure 4:
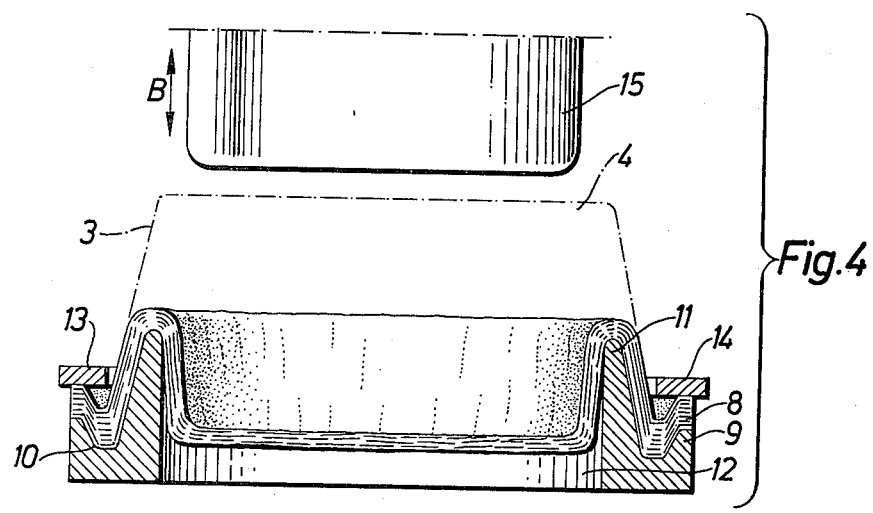
FIG. 4 is a side view, partly in section, of an inverted stack of disposable inserts and apparatus for forming a multipack thereof according to a first embodiment of the invention.

In a first method of forming a multipack of inserts 1, an inverted stack of nested disposable inserts 1 of the kind shown in FIG. 1 is mounted on a tubular support or form 9 (FIG. 4) having a recess 10 shaped to receive and hold the stiff upper peripheral collar and edge flanges 8, and an annular, upwardly extending, inwardly tapering, tubular member 11 adapted to extend inside the lower open ends of the inserts 1. The vertical height of the tubular member 11 will be chosen depending upon the desired location of the fold in the inserts 1. During the actual folding operation, the edge flanges 8 may be suitably retained in the support 9 by means such as collet jaws 13, 14 which are adapted to engage the outermost edge flange 8 so as to apply pressure on the other edge flanges in the direction of the recess 10.

The actual folding of the side walls 3 is suitably performed by a cylindrical member 15 concentrically disposed with respect to the support 9. The cylindrical member 15 is movable in the direction of the arrow B and arranged during its downward movement to engage the bottom walls 4 at their original positions shown in dotted lines in FIG. 4, and to fold the sides 3 of the inserts 1 over the top of the tubular member 11 into the interior space 12.

When the folding operations have been completed, the cylindrical member 15 and the collet jaws 13, 14 can be returned to their original positions and the multipack of inserts thus obtained removed from the support 9. If desired, the completed multipack may be provided with a protective outer casing, such as shrink film or the like.

Figure 5:
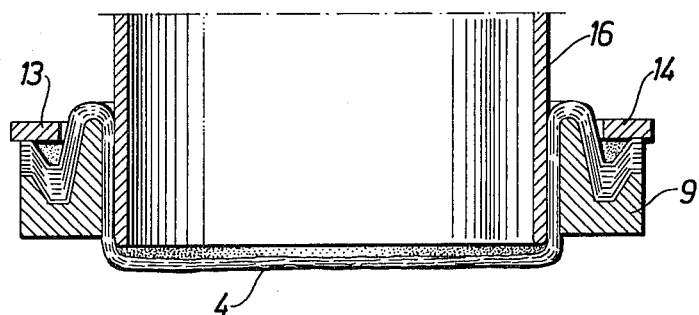
FIGS. 5 and 6 illustrate a second technique for manufacturing multipacks of disposable inserts according to the invention.
Figure 6:
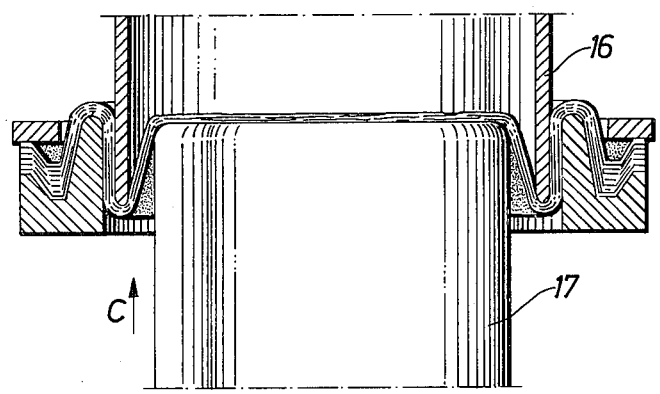

Another method of forming a multipack of inserts is illustrated in FIGS. 5 and 6, in which a double fold of the side walls is effected. In that method, an inverted stack of inserts 1 like that shown in FIG. 3 is placed on a tubular support 9 similar to that shown in FIG. 4 and a first fold is effected by a first cylindrical member 16, similar to the member 15 in FIG. 4 but having a central opening, into which a second member 17 can be inserted from the opposite direction. The member 16 may be tubular and it is adapted to be moved somewhat further into the support 9 than in the case of FIG. 4, so that the bottoms 4 of the inserts 1 in the stack are moved downwardly to a point below the plane formed by the lower edge of the support 9.

In the next stage, the cylindrical member 16 is retracted slightly, as shown in FIG. 6, and a second cylindrical member 17, disposed concentrically with the member 16 and the support 9, is moved upwardly in the direction of the arrow C to provide a second fold in the side walls 3 of the inserts 1. The side walls 3 and bottoms 4 of the stacked inserts are thus double folded inside the space 12 in the support 9. The cylindrical members 16 and 17 can then be retracted to their initial positions, the collet jaws 13, 14 released, and the double folded stack of inserts 1 removed from the support 9.

Figure 7:
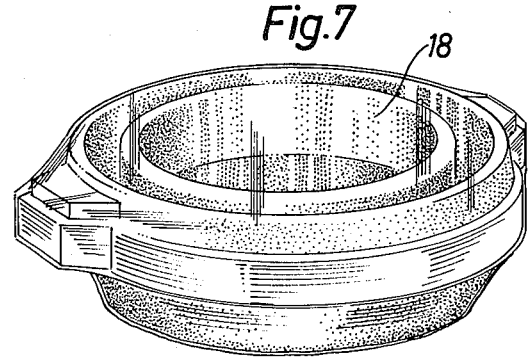
FIG. 7 is a perspective view of a completed multipack formed in accordance with the invention, enclosed in a shrink film casing.

A packaging arrangement produced in accordance with the method shown in connection with FIGS. 5 and 6, and finally provided with a protective shrink film casing 18, is illustrated in FIG. 7.

It should be obvious to one or ordinary skill in the art that the flexible side wall of each folded liner allows the liner to be unfolded to its original size for insertion into a cooking vessel as is done with the conventional liner of FIGS. 1 and 2.

While the invention has been described and illustrated with reference to either a single or double fold operation, it will be understood that modifications in the process and resulting multipack are possible without departing from the inventive concepts taught herein. Also, while the invention has been described with reference to disposable inserts intended to be used with cooking vessels, it will be understood that the methods and means of the present invention are equally applicable to the manufacture of multipacks of other types of inserts. All such variations and modifications are intended to be encompassed within the scope of the invention, as defined in the following claims.

I claim:

1. A method of forming a multiple pack from a plurality of pre-formed, substantially bowl-shaped, disposable vessels each having a bottom wall and adjoining side wall made of thin, flexible material and a stiff, upper, peripheral collar joined to the upper end of said side wall, said bottom wall, side wall, and collar defining an interior, substantially bowl-shaped space, wherein said vessels are capable of being stacked one inside of another, comprising the steps of folding said side wall of each of a plurality of said vessels individually to move the bottom wall into said space at least substantially to the upper collar and nesting a plurality of the folded vessels into stacked relation.

2. A method of forming a multiple pack from a plurality of pre-formed, substantially bowl-shaped, disposable vessels each having a bottom wall and adjoining side wall made of thin, flexible material and a stiff, upper, peripheral collar joined to the upper end of said side wall, said bottom wall, side wall, and collar defining an interior, substantially bowl-shaped space, wherein said vessels are capable of being stacked one inside of another, comprising the steps of nesting a plurality of said vessels in stacked relation, and folding said side walls to move the nested bottom walls into said space at least substantially to the nested upper collars.

3. A method as defined in claim 2 in which the nested vessels are mounted on a form having a flanged portion adapted to support the nested upper collars of the vessels and a central, tubular member adapted to extend into said interior space, the nested vessels are retained in assembled relation on the form, and the flexible side walls of the nested vessels are folded over said tubular member into said interior space by moving in the direction of said nested collars a cylindrical member applied to the bottoms of said nested vessels.

4. A method as defined in claim 3 in which the cylindrical member is tubular in shape and open ended, the flexible side walls of said nested vessels are again folded by moving another cylindrical member in the opposite direction against the bottoms of said nested vessels to fold the flexible side walls of the latter over and into the open end of said tubular cylindrical member, withdrawing said cylindrical members, and removing the nested, folded vessels from said form.

5. A method as defined in claim 4 in which the nested, folded vessels are encased in an envelope.

* * * * *